Jan. 8, 1957 J. C. BANCROFT 2,776,735
WINDOW FRAME CONSTRUCTION
Filed Sept. 18, 1953 3 Sheets-Sheet 1
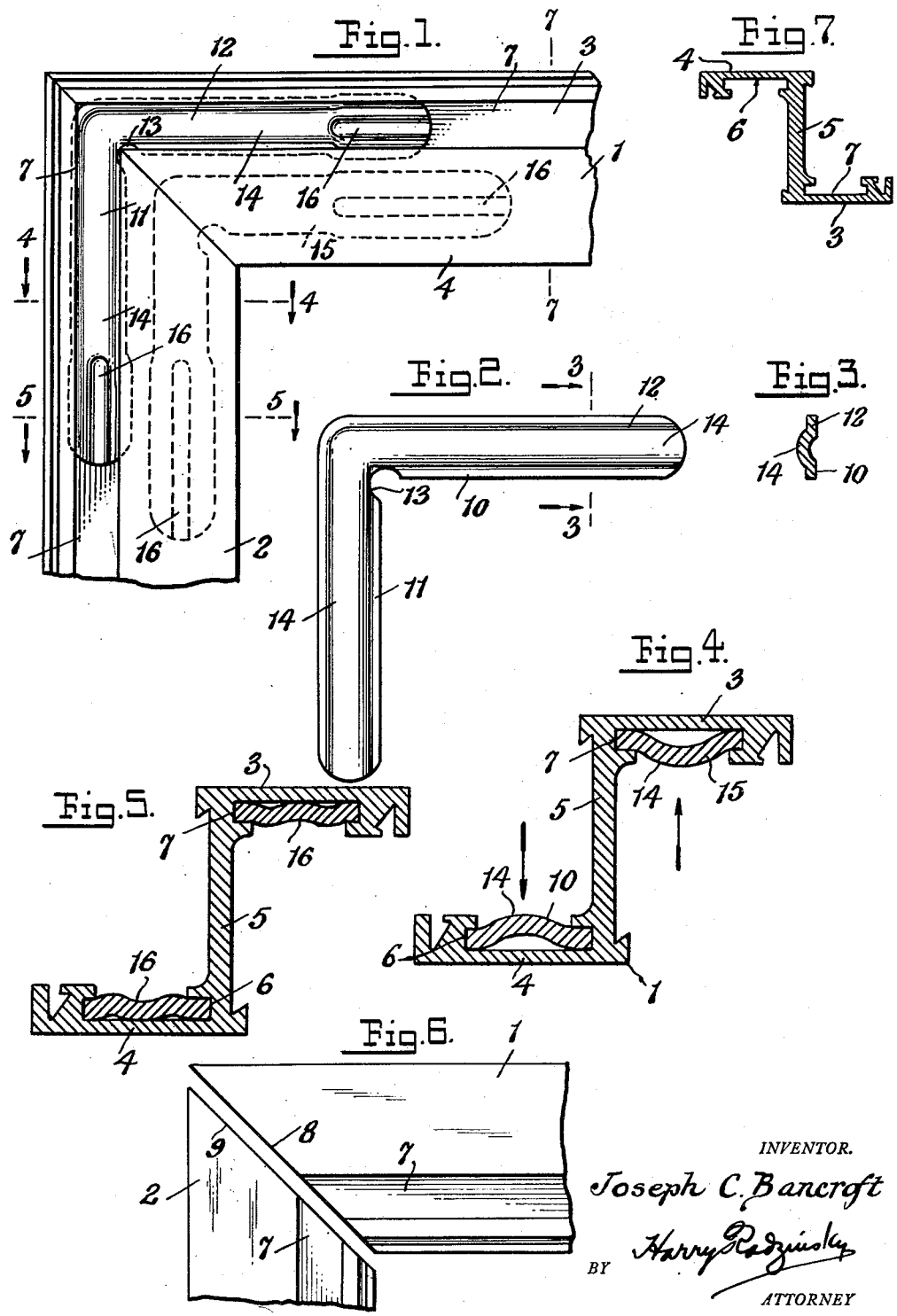
INVENTOR.
Joseph C. Bancroft
BY Harry Radzinsky
ATTORNEY Jan. 8, 1957 J. C. BANCROFT 2,776,735
WINDOW FRAME CONSTRUCTION
Filed Sept. 18, 1953 3 Sheets-Sheet 2
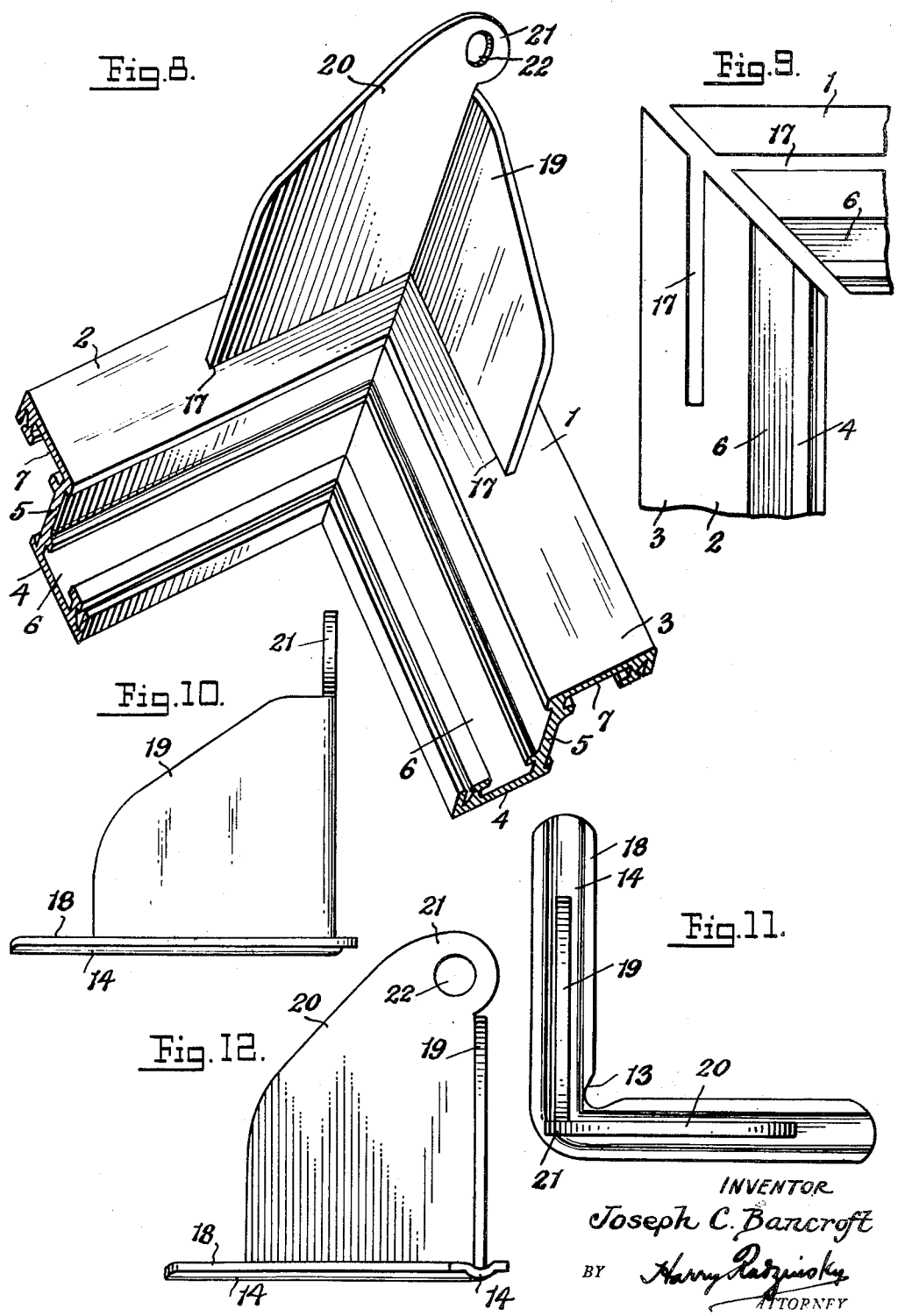
INVENTOR
Joseph C. Bancroft
BY Harry Radzinsky
ATTORNEY Jan. 8, 1957   J. C. BANCROFT   2,776,735
WINDOW FRAME CONSTRUCTION
Filed Sept. 18, 1953   3 Sheets-Sheet 3
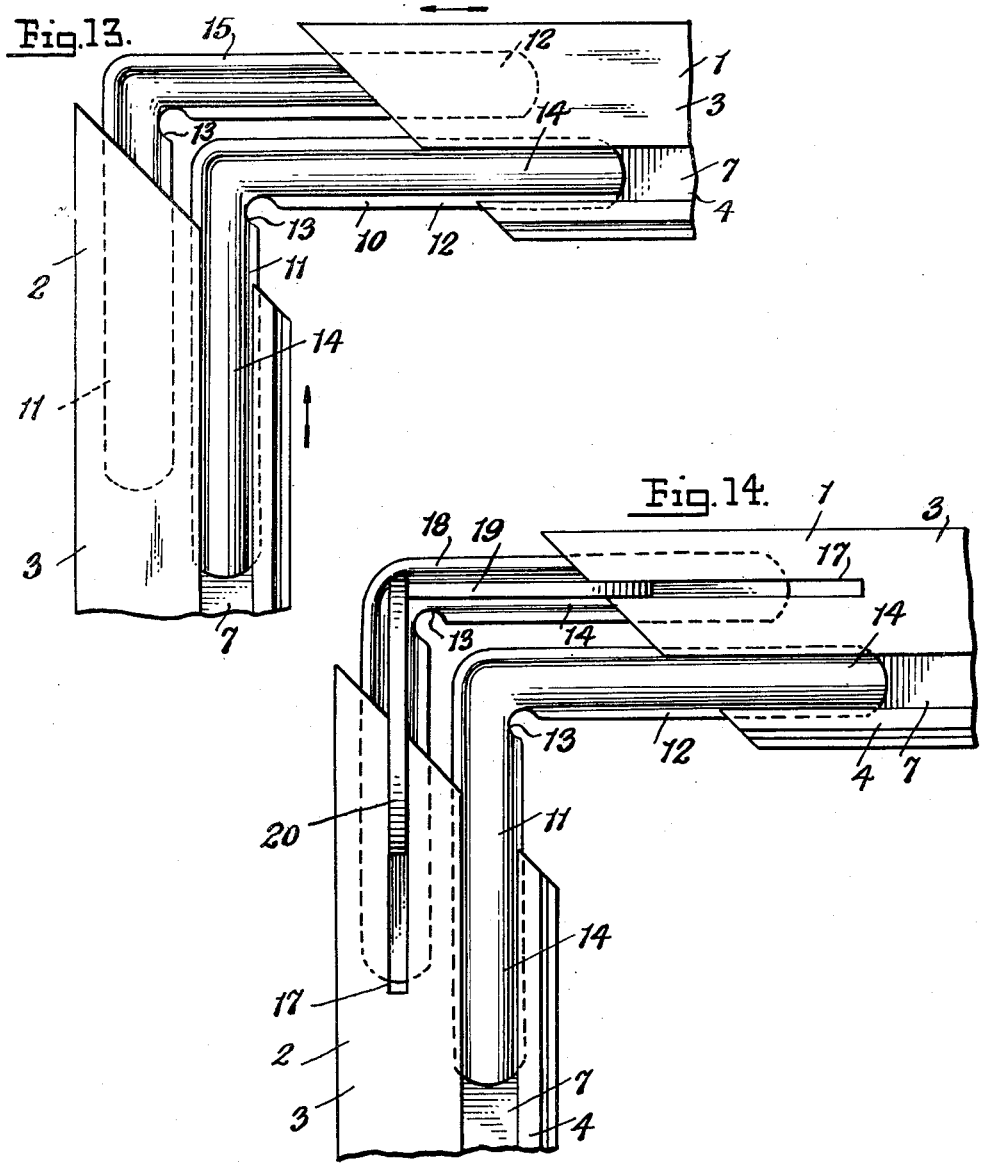
INVENTOR.
Joseph C. Bancroft
BY Harry Radzinsky
ATTORNEY

United States Patent Office 2,776,735
Patented Jan. 8, 1957

2,776,735

WINDOW FRAME CONSTRUCTION

Joseph C. Bancroft, Jamestown, N. Y.

Application September 18, 1953, Serial No. 381,006

3 Claims. (Cl. 189—36)

This invention relates to windows, and more particularly to those of the metal casement type. One of the objects of the invention is to provide means for uniting or securing together the various parts of the window or casement frame, and especially at the corners thereof.

Metal window frames as constructed at the present time, usually require welding at the corner joints and at other parts of the frame, together with other finishing steps which not only increase the cost of production, but also increase shipping cost, labor cost and other production expense. It is an object of the present invention to provide not only a means but a method by which the parts of the frame may be assembled into operative relationship in a manner which will produce an extremely strong frame. It is another object of the invention to provide an improved corner joint for window frames which can be easily produced by simple and inexpensive apparatus usable by inexperienced help, thus enabling the frames to be shipped in knock-down or dis-assembled condition to a dealer provided with the simple apparatus required to effect the assembly of the frames.

It is an object of the invention to provide a corner joint for metal window frames in which the parts are assembled in operative position without welding or similar steps, and by which the frames can be speedily assembled at a minimum of manufacturing cost.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a face view of a corner portion of a window or casement frame, showing the improved corner joint;

Fig. 2 is a face view of one of the connection members or keys;

Fig. 3 is a sectional view, taken substantially on the line 3—3 of Fig. 2, looking in the direction of the arrows;

Fig. 4 is a sectional view, taken substantially on the line 4—4 of Fig. 1, looking in the direction of the arrows;

Fig. 5 is a sectional view, taken substantially on the line 5—5 of Fig. 1, looking in the direction of the arrows;

Fig. 6 is a view of portions of two of the frame members in separated relation;

Fig. 7 is a sectional view on the line 7—7 of Fig. 1;

Fig. 8 is a perspective view of one of the corners of the casement frame, showing one of the hinge brackets in position;

Fig. 9 is a face view of portions of two of the frame members to show the slots formed therein for the reception of parts of the hinge bracket;

Fig. 10 is an end view of the hinge bracket;

Fig. 11 is a top plan view of the hinge bracket;

Fig. 12 is a view looking toward the inside of the hinge bracket;

Fig. 13 is a face view of parts of two of the frame members in the act of being slid toward one another on the connection members or keys, and Fig. 14 is a similar view showing the frame members in the act of being moved toward one another on the keys, on one of which the hinge bracket is provided.

Referring to the drawings, and particularly to Figs. 1 to 6 thereof, 1 indicates one of the frame members of a metallic casement sash, and 2 the similar second member thereof. These frame members are made of metal, and preferably, but not necessarily, of aluminum. The suggested cross-sectional shape of each of the frame members 1 and 2 is clearly shown in Fig. 7 wherein it will be noted that each of these frame members is roughly Z-shape in cross section, and is thus provided with inner and outer flanges respectively indicated at 3 and 4 integrally connected by the web portion 5. Provided in one face of the flange 4 is a continuous, longitudinally-extending undercut channel or groove 6, and a similar undercut channel or groove 7 is formed in a face of the flange 3. The end of each of the frame members 1 and 2 is beveled, as indicated respectively at 8 and 9, and when these two beveled ends are brought into abutment, the two frame members will be disposed at true right angles to one another in the known manner. It will be noted that the two grooves 6 and 7 are disposed on opposite sides of the web 5 and that said grooves have their open sides directed toward one another or in other words, they face in opposite directions.

The means for coupling together the two frame members in their right-angular relationship consists of two L-shaped angle-pieces or keys constituting connection members, and which are fitted in and expanded within the grooves 6 and 7. One of these connection members or keys is shown at 10 in Fig. 2, before it is fitted in place in the frame and before it has been swaged or expanded. It will be therein noted that the connection member or key consists of a substantially L-shaped or angular elongated strip of deformable metal, such as aluminum, which has the two legs indicated respectively at 11 and 12, disposed at right angles to one another. A notch indicated at 13 located at the junction of the two legs 10 and 11 facilitates the bending of the strip into the proper right-angle position or L-shape shown. As will be seen in the cross-sectional view in Fig. 3 the angle-piece or connection member 10 is transversely arched as indicated at 14 for its entire length. Two of these connection members are used and both are similar in shape and construction, the second being indicated at 15 in the drawing. The width of the legs 11 and 12 of the connection members is such that these legs may be freely fitted into the grooves 6 and 7. When the two keys or connection members are placed in their grooves 6 and 7 it will be seen that each key has its convex face directed outwardly or is visible in the groove. Thus, the concave faces of the two keys face toward one another.

By reference to Fig. 13, the manner in which the connection members or keys 10 and 15 are fitted into place at the corner of the casement frame will be seen. It will be therein noted that by fitting the legs of the connection members into the grooves 6 and 7 and sliding the two frame members 1 and 2 toward one another as indicated by the arrows, until the beveled ends 8 and 9 come into abutment, the right-angle corner of the frame will be formed and it will then be a matter of anchoring the keys, or at least portions of the same, firmly in the grooves 6 and 7 to thereby maintain the parts of the frame in their assembled relationship as seen in Fig. 1.

The parts 1 and 2 of the frame are now firmly held together by suitable jigs, clamps or other supports and pressure of suitable swaging tools is applied upon at least portions of the arched legs 11 and 12 of the two keys or connection members 10 and 15, the pressure being applied in opposite directions as indicated by the arrows in Fig. 4 and simultaneously applied to both keys 10 and 15 while the frame elements are securely held. The deforming action of the swaging tools on the legs 11 and 12 is noted in Fig. 5 and indicated on the drawings at 16. It will be noted that by the force exerted by the swaging tools, the end portions of the two legs of each of the connection members or keys 10 and 15 have been flattened or deformed in a manner to increase the effective widths of these parts of the keys so that the keys are now securely wedged within the grooves 6 and 7 and are immovable therein. The result is that the frame members 1 and 2 are now securely locked together in their proper right-angular relationship as indicated in Fig. 1.

It will be noted that through this arrangement, the joinder of two frame members in the proper right-angular relationship is merely a matter of placing the connection members or keys in the grooves in the frame members, holding the parts together while pressure is applied on portions of the keys to deform said portions, and wedging said portions of the keys within the grooves in which they are fitted. Since this requires the employment of simple clamps and swaging tools it is apparent that the parts of the frames can be shipped for ready assembly by the dealer provided with these tools.

In Figs. 8 to 12 inclusive and 14, a modified construction is disclosed, wherein the manner in which a hinge bracket is applied to the frame is shown. It will be therein noted that the two frame members 1 and 2 are each provided with an elongated slot 17 extending inwardly from the beveled ends 8 and 9 of these frame members. A connection member or key 10 is fitted in the groove 7 of the two frame members in the manner previously described, this connection member however being omitted from the drawings in Fig. 8 to clearly show the position of that groove. The second connection member or key shown at 18, and which is fitted into the groove 6 of the frame members 1 and 2, differs from that shown at 10 in that it is provided with the angularly-connected flanges or plates 19 and 20 constituting the hinge bracket for the casement frame. The flanges 19 and 20, which may be integrally formed, are securely attached to or might be integrally formed with, the key or connection member 18 which freely slides in the groove 6 when the two frame members 1 and 2 are slid toward one another to bring their beveled ends 8 and 9 into abutment. The slots 17 in the frame members 1 and 2 receive the flanges 19 and 20, as clearly seen in Figs. 8 and 14. The flange 30 of the bracket is formed at its end with the rounded lug 21 having the hole 22 for the reception of the hinge pivot pin of the casement. In this embodiment of the invention, the keys or connection members 10 and 18 are deformed or expanded by the swaging action as previously described, to thereby firmly anchor them in the respective grooves 6 and 7 and form a strong corner on the frame having a firmly-anchored hinge bracket.

While I have herein described a single embodiment of the invention, it is obvious that various changes may be made in the same without departing from the spirit of the invention. For example, the cross-sectional shape of the frame members may differ from that shown; the shapes of the keys and grooves therefor might be altered, and various other modifications can be made as will be apparent to those skilled in this art and as is contemplated by the scope of the claims appended hereto.

It will be noted that the present invention has been described as being applicable to window frames. This, of course, means the frame proper as well as the sash swingable or otherwise movably mounted therein. Also, the invention can be used in conjunction with the construction of doors or other rectangular frames.

What I claim is:

1. In a window frame construction, a pair of frame members having bevelled ends placed together to bring the frame members at right angles to form a corner of a window frame, each of the frame members being roughly Z-shaped in cross section and having spaced, parallel inner and outer flanges connected by an integral web, each of the flanges having an undercut groove formed in its inside face, the grooves opening toward one another, a connection member in the form of a metal angle strip having legs extended into the grooves, said legs being of a width greater than the width of the grooves and each of the legs being transversely arched to reduce the width of the legs to provide a tight fit when placed in the grooves and subsequently reversely arched for a portion of their lengths to thereby expand them in the grooves without distortion of the walls of the grooves.

2. In a window frame construction, a pair of frame members placed together at right angles to form a corner of a window frame, each of the frame members consisting of front and back flanges joined by a web at substantially right angles to the flanges, each of the flanges being provided in its rear face with an undercut groove, the grooves being located at opposite sides of the web and opening toward one another, a connection member in the form of a metal strip fitted in each groove, the strips each having swaged portions located within the grooves to thereby hold the strips immovably therein without distorting the grooves and to retain the frame members connected together in their right-angular relationship, the swaged portions including a central indenture and lateral raised portions to provide frictional contact between the flanges and strips.

3. In a window frame construction, a pair of frame members placed together at right angles to form a corner of a window frame, each of the frame members consisting of front and back flanges joined by a web at substantially right angles to the flanges, each of the flanges being provided in its rear face with an undercut groove, the grooves being located at opposite sides of the web and opening toward one another, a connection member in the form of a metal strip fitted in each groove, the strips each having swaged portions located within the grooves to thereby hold the strips immovably therein without distorting the grooves and to retain the frame members connected together in their right-angular relationship, said flanges projecting in opposite directions from the opposite ends of the web, the strips each being transversely undulated at their ends to thereby swage them in the grooves and hold the frame members together at the corner thereof.

References Cited in the file of this patent

UNITED STATES PATENTS

| | | |
|---|---|---|
| 824,693 | Hood | June 26, 1906 |
| 994,933 | Kirk | June 13, 1911 |
| 1,808,490 | Baum | June 2, 1931 |
| 1,881,877 | Nickelsen | Oct. 11, 1932 |
| 2,101,349 | Sharp | Dec. 7, 1937 |
| 2,447,347 | Krantz | Aug. 17, 1948 |
| 2,453,503 | Emmons | Nov. 9, 1948 |
| 2,632,535 | Clerk | Mar. 24, 1953 |
| 2,717,667 | Bancroft | Sept. 13, 1955 |

FOREIGN PATENTS

| | | |
|---|---|---|
| 302,256 | Italy | Oct. 22, 1932 |
| 468,771 | Canada | Oct. 17, 1950 |
| 468,772 | Canada | Oct. 17, 1950 |
| 282,005 | Switzerland | July 16, 1952 |
| 284,017 | Switzerland | Nov. 1, 1952 |
| 872,847 | Germany | Apr. 9, 1953 |